UNITED STATES PATENT OFFICE 2,570,296

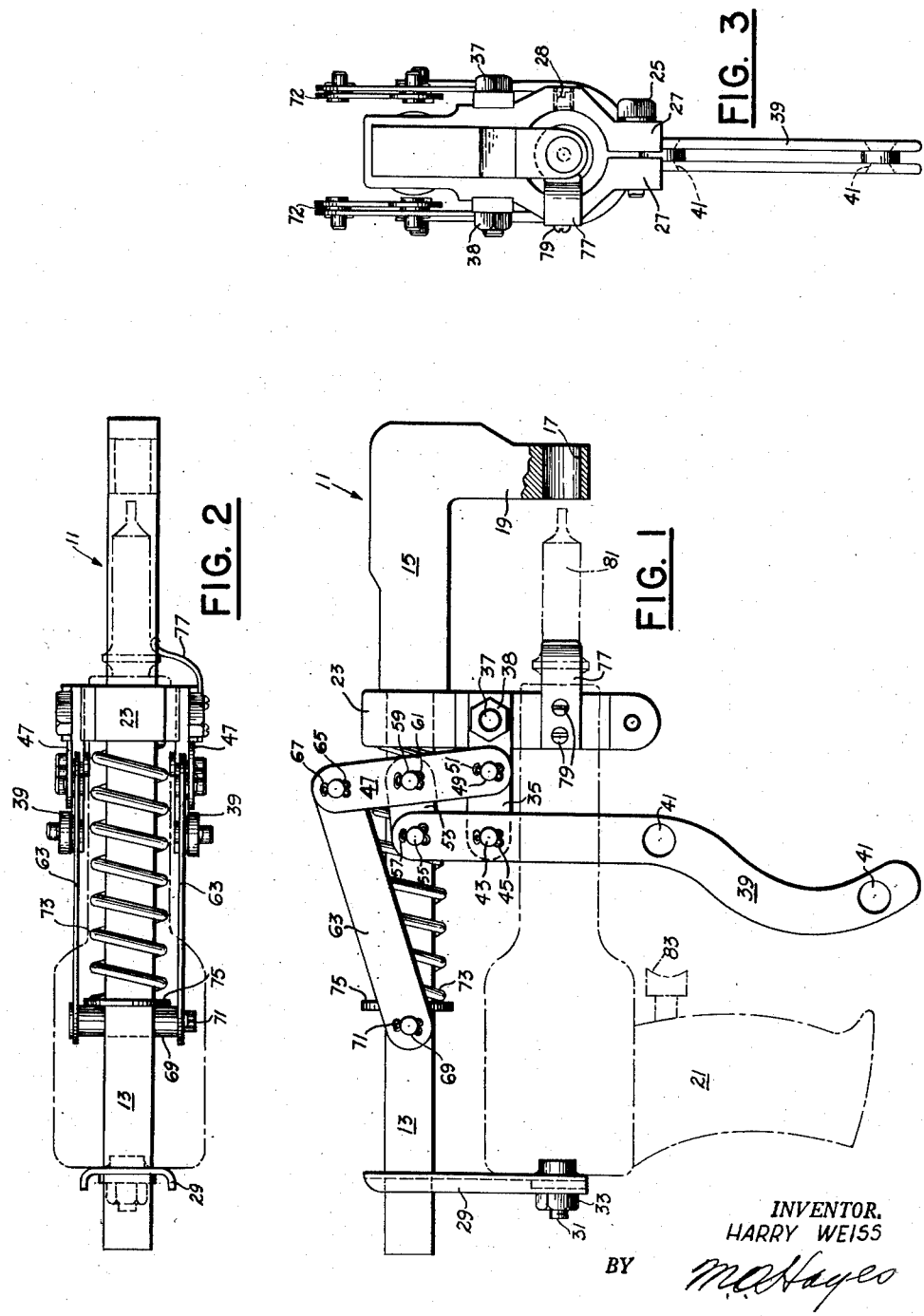

AUTOMATIC RIVET PUNCH

Harry Weiss, Philadelphia, Pa.

Application September 20, 1948, Serial No. 50,230

7 Claims. (Cl. 74—105)

(Granted under the act of March 3, 1883, as amended April 30, 1928; 370 O. G. 757)

This invention relates to improvements in force-multiplying linkages, and more particularly pertains to improvements in dollybar attachments for removing rivets from a workpiece.

In removing the grip portion of a rivet from a workpiece after the head has been removed, it has been conventional practice to tap the grip portion out by hand punch, to employ a drill, or to use an extractor applying lever-multiplied force to the said grip portion. Such practices have proven to be time-consuming, cumbersome, and inefficient for the purpose intended.

The principal object of this invention is to provide a dollybar attachment for removing the grip portion of a rivet from a workpiece after the head has been removed, said attachment embodying a novel force-multiplying linkage.

Another object is to provide a force-multiplying linkage whereby appreciable linear thrust force can be effected.

A further object is to provide a force-multiplying linkage of simple construction that can be attached to a conventional riveter for the purpose of removing the grip portion of a rivet after the head of such rivet has been removed.

Other objects and many of the attendant advantages of this invention will be readily appreciated as the same becomes better understood by reference to the following detailed description when considered in connection with the accompanying drawing wherein:

Fig. 1 is a side elevation, partly in section, of a dollybar attachment for a rivet gun, which is shown in phantom;

Fig. 2 is a plan view of said attachment, also showing such rivet gun in phantom; and Fig. 3 is an end elevation of said attachment.

Similar numerals refer to similar parts throughout the several views.

Dollybar 11 has a bar or shank portion 13 that is square in cross-section and a head portion 15 of L-shape, generally rectangular in cross-section and somewhat larger in dimensions than said shank portion to provide a shoulder that serves as a limit stop for the yoke hereinafter described. A bore 17 extends through the anvil portion 19 of said dollybar.

The shank portion 13 of said dollybar is mounted on a rivet gun 21 in such a manner that said shank portion is carried parallel to the axis of the bore of said gun and is slidable relative said gun. This is accomplished by providing a yoke 23 that has a slot or channel cut therethrough, said channel carrying said shank portion slidably, and a split sleeve portion adapted to be positioned upon the barrel of the rivet gun 21. Square-head bolt 25 couples the depending ears 27 of said split sleeve portion to provide means to clamp said yoke 23 securely upon such barrel. Socket setscrew 28, extending through said yoke and adapted to engage the barrel of the rivet gun 21, aids in preventing rotation or slipping of said yoke relative said gun.

Guide plate 29 is adapted to be carried on stud 31, which is secured on the rear face of the butt of rivet gun 21. Bolt 33 fastens said guide plate 29 securely on said stud. Said guide plate extends beyond said butt, and is provided with a slot or channel cut therethrough, said channel carrying the shank portion 13 of the dollybar slidably.

Arms 35 are fixed to opposite sides of said yoke 23 by bolt 37, which extends through yoke 23, said arms extending rearwardly from said yoke parallel to said dollybar. Nut 38 retains said bolt and arms in position. Tongued lever-arm 39 depends from rotatable engagement with the ends of arms 35 distal yoke 23, the two halves of said lever-arm being secured together at their lower portion by rivets 41 to form a handle operable by pressing said handle towards the butt of the gun 21 with the fingers of the hand holding said gun. Pins 43, secured by cotter pins 45, provide the means for securing arm 35 to lever-arm 39 rotatably, said pins extending through the tongues of said lever-arm at a point spaced from the ends of said tongues, as shown in Fig. 1.

Links 47 have one end secured rotatably to points on arms 35 between yoke 23 and lever-arm 39 by means of pins 49 and cotter pins 51. Links 53 have one end secured rotatably to the tongue ends of lever-arm 39 by means of pins 55 and cotter pins 57, and their other ends secured rotatably to points on links 47 medial the length of said links 47 by means of pins 59 and cotter pins 61. Links 63 have one end secured rotatably to the ends of links 47 by means of pins 65 and cotter pins 67, and their other ends secured rotatably on the ends of tube 69, which passes through dollybar 11 and is secured thereon by cotter pin 71. Washers 72 carried on said pins between the links space said links sufficiently to facilitate relative rotation. All of said above mentioned links thus rotate in parallel or common planes, as shown in the drawing.

Compression coil-spring 73 is carried on the shank portion 13 of said dollybar between the rearward face of yoke 23 and a washer 75, which bears against tube 69. Said coil spring 73 is shown in the drawing at its inactive position.

Leaf spring 77 is secured to yoke 23 by screws 79, said leaf spring extending forward from said yoke to provide a guide and retainer for the punch 81 of the rivet gun.

In operation, with the above-described dollybar attachment mounted upon a rivet gun, a workpiece is positioned between the anvil portion 19 and punch 81, with the grip to be removed from the workpiece aligned with said punch. This is effected by squeezing lever-arm 39 towards the butt of the rivet gun, such action increasing the distance between said anvil portion and the end of the punch and compressing coil spring 73. With the workpiece held in position by the force of the coil spring 73, the rivet gun is actuated by means of trigger 83, thereby driving the grip out of the workpiece and through the bore 17 in the anvil.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

I claim:

1. In a dollybar attachment for rivet guns comprising a yoke adapted to be secured to the barrel of a rivet gun, a plate adapted to be secured to the butt of such gun, and a dollybar mounted slidably in slots in said yoke and said plate, and linkage comprising a pair of arms adapted to be fixed to opposite sides of said yoke and to extend rearwardly parallel to said dollybar, a lever-arm depending from rotatable engagement with the ends of said arms distal said yoke, first links having one end secured rotatably to said arms medial said yoke and said lever-arm, second links secured rotatably to said lever-arm and the medial portions of said first links, third links secured rotatably to the ends of said first links distal said arms and to said dollybar, and a spring carried on said dollybar, said spring being adapted to urge said dollybar rearwardly relative said yoke.

2. In a dollybar attachment for rivet guns comprising a yoke having a split collar adapted to be secured to the barrel of a rivet gun, a plate adapted to be secured to the butt of such gun, and a dollybar mounted slidably in slots in said yoke and said plate for movement parallel to the axis of the barrel of said rivet gun, a linkage comprising a pair of parallel arms adapted to be fixed to opposite sides of said yoke and to extend rearwardly parallel to said dollybar, a tongued lever-arm depending from rotatable engagement with the ends of said arms distal said yoke, first links having one end secured rotatably to said arms medial said yoke and said lever-arm, second links secured rotatably to said lever-arm and the medial portions of said first links, third links secured rotatably to the ends of said first links distal said arms and to said dollybar, and a spring carried on said dollybar, said spring being adapted to urge said dollybar rearwardly relative said yoke.

3. A linkage comprising a bar, a yoke carried slidably on said bar, a first arm fixed to said yoke, a second arm carried rotatably by said first arm, a first link carried rotatably by said second arm, a second link carried rotatably by said first arm and said first link, and a third link carried rotatably by said second link and said bar.

4. A linkage comprising a bar, a yoke carried slidably on said bar, a first arm fixed to said yoke, a second arm carried rotatably by said first arm, a first link carried rotatably by said second arm, a second link carried rotatably by said first arm and said first link, a third link carried rotatably by said second link and said bar, and means to constrain movement of said yoke towards said third link.

5. A linkage comprising a bar, a yoke carried slidably on said bar, a first arm fixed to said yoke, a second arm carried rotatably by said first arm, a first link carried rotatably by said second arm, a second link carried rotatably by said first arm and said first link, a third link carried rotatably by said second link and said bar, and a spring coiled on said bar and bearing against said yoke and said third link.

6. A linkage comprising a bar, a yoke carried slidably on said bar, a first arm having one end fixed to said yoke and extending parallel to said bar, a second arm mounted rotatably on the other end of said first arm at a point spaced from one end of said second arm, a first link having one end mounted rotatably on said one end of the second arm, a second link having one end carried rotatably by said first arm between said yoke and said second arm, said second link being secured rotatably to the other end of said first link at a point spaced from said one end, a third link having one end carried rotatably on the other end of said second link and having its other end secured rotatably to said bar, and a spring coiled on said bar and bearing against said yoke and said third link.

7. A linkage comprising a bar, a yoke carried slidably on said bar, a plurality of first arms each having one end fixed to said yoke and extending parallel to said bar, a plurality of second arms each mounted rotatably on the other end of one of said first arms at a point spaced from one end of said second arm, a plurality of first links each having one end mounted rotatably on said one end of one of said second arms, a plurality of second links each having one end carried rotatably by one of said first arms between said yoke and one of said second arms, said second links each being secured rotatably to the other end of one of said first links at a point spaced from said one end, a plurality of third links each having one end carried rotatably on the other end of one of said second links and having its other end secured rotatably to said bar, and a spring coiled on said bar and bearing against said yoke and said third links.

HARRY WEISS.

REFERENCES CITED

The following references are of record in the file of this patent:

UNITED STATES PATENTS

| Number | Name | Date |
|---|---|---|
| 1,007,351 | Hart | Oct. 31, 1911 |
| 1,222,429 | Linton | Apr. 10, 1917 |
| 1,430,292 | Dicks | Sept. 26, 1922 |
| 1,752,642 | Larson et al. | Apr. 1, 1930 |